(12) United States Patent
Sandinge et al.

(10) Patent No.: US 11,351,950 B2
(45) Date of Patent: Jun. 7, 2022

(54) VEHICLE SEAT

(71) Applicant: Autoliv Development AB, Vargarda (SE)

(72) Inventors: Par Sandinge, Alingsås (SE); Mikaela Hagg, Alingsås (SE); Hanna Karlsson, Stora Levene (SE); Malin Leijer, Lidköping (SE); Mats Berntsson, Alingsås (SE); Kevin Wikstedt, Trollhättan (SE); Fredrik Kjell, Alingsås (SE); Carl-Johan Svensson, Vargarda (SE); Jules Houessou, Gothenburg (SE); Ola Henriksson, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/977,879

(22) PCT Filed: Mar. 4, 2019

(86) PCT No.: PCT/EP2019/055295
§ 371 (c)(1),
(2) Date: Sep. 3, 2020

(87) PCT Pub. No.: WO2019/170596
PCT Pub. Date: Sep. 12, 2019

(65) Prior Publication Data
US 2021/0001799 A1    Jan. 7, 2021

(30) Foreign Application Priority Data

Mar. 6, 2018 (EP) ..................... 18160339

(51) Int. Cl.
*B60R 21/207* (2006.01)
*B60R 21/233* (2006.01)
(Continued)

(52) U.S. Cl.
CPC .......... *B60R 21/233* (2013.01); *B60R 21/207* (2013.01); *B60R 21/232* (2013.01);
(Continued)

(58) Field of Classification Search
CPC . B60R 21/207; B60R 21/233; B60R 21/2334; B60R 21/268; B60R 21/237;
(Continued)

(56) References Cited

U.S. PATENT DOCUMENTS 9,533,651 B1   1/2017 Ohno et al.
2017/0144622 A1   5/2017 Perlo et al.
(Continued)

FOREIGN PATENT DOCUMENTS

DE   195 29 829 C1   10/1996
EP   1 193 141 A2    4/2002
(Continued)

OTHER PUBLICATIONS

International Search Report of the International Searching Authority for PCT/EP2019/055295 dated Jun. 19, 2019.
(Continued)

*Primary Examiner* — Keith J Frisby
(74) *Attorney, Agent, or Firm* — Harness, Dickey & Pierce, P.L.C.; Stephen T. Olson

(57) ABSTRACT

A vehicle seat for supporting an occupant in a sitting position includes a backrest, and an airbag unit. The airbag unit comprises an inflatable airbag provided in an initially rolled and/or folded airbag package, and an inflator actuable to direct inflating gas into the airbag to inflate the airbag into an inflated configuration. The airbag comprises a pair of inflatable chambers which are physically connected to one another via a connecting interface, and are fluidly isolated from one another. The airbag unit is mounted and configured such that, upon actuation of said inflator to inflate the airbag,
(Continued)

the inflatable chambers inflate into respective deployed positions in which they: i) extend forwardly from respective opposing and laterally spaced-apart side regions of said backrest; and ii) extend upwardly, and laterally inwardly across an uppermost region of the seat towards said connecting interface, so as to thereby cooperate to define an inflated shroud around at least an uppermost region of the backrest so as to extend over the sitting position and provide lateral protection to a said occupant of the seat in the sitting position.

20 Claims, 10 Drawing Sheets

(51) Int. Cl.
| | | |
|---|---|---|
| B60R 21/2334 | (2011.01) | |
| B60R 21/2338 | (2011.01) | |
| B60R 21/231 | (2011.01) | |
| B60R 21/232 | (2011.01) | |
| B60R 21/235 | (2006.01) | |
| B60R 21/237 | (2006.01) | |
| B60R 21/264 | (2006.01) | |
| B60R 21/26 | (2011.01) | |
| B60R 21/261 | (2011.01) | |

(52) U.S. Cl.
CPC ........ *B60R 21/235* (2013.01); *B60R 21/2334* (2013.01); *B60R 21/2338* (2013.01); *B60R 21/23138* (2013.01); *B60R 21/237* (2013.01); *B60R 21/264* (2013.01); *B60R 2021/23146* (2013.01); *B60R 2021/23192* (2013.01); *B60R 2021/23308* (2013.01); *B60R 2021/23316* (2013.01); *B60R 2021/23386* (2013.01); *B60R 2021/23509* (2013.01); *B60R 2021/23547* (2013.01); *B60R 2021/2612* (2013.01); *B60R 2021/26058* (2013.01)

(58) Field of Classification Search
CPC ............ B60R 21/23138; B60R 21/231; B60R 21/2338; B60R 2021/0048; B60R 2021/23146; B60R 2021/23308; B60R 2021/23386; B60R 2021/23316; B60R 2021/23547; B60R 2021/26058; B60R 2021/2612
USPC ...................................... 280/730.1
See application file for complete search history.

(56) References Cited

U.S. PATENT DOCUMENTS

| | | | |
|---|---|---|---|
| 2017/0291564 A1* | 10/2017 | Ohmi | .................... B60R 21/207 |
| 2018/0194317 A1* | 7/2018 | Barbat | ..................... B60N 2/90 |

FOREIGN PATENT DOCUMENTS

| | | | |
|---|---|---|---|
| EP | 3536563 A1 | 9/2019 | |
| KR | 2008 0080968 A | 9/2008 | |
| WO | 2015/145285 A1 | 10/2015 | |

OTHER PUBLICATIONS

Office Action issued in correesponding European Application No. 2018160339.0, dated May 26, 2020.

* cited by examiner

VEHICLE SEAT

FIELD

The present invention relates to a vehicle seat, and more particularly relates to a vehicle seat equipped with an airbag unit to provide protection to an occupant of the seat in the event of a crash.

BACKGROUND

In order to prevent or reduce injuries to occupants of motor vehicles arising from accidents involving side impacts, oblique impacts, or involving a motor vehicle rolling over, it has been proposed previously, and indeed is now common, to provide vehicles with so-called inflatable curtains ('IC'). Conventional ICs are usually mounted along the lateral sides of the vehicle structure, above the side windows. In an appropriate accident situation, as determined by one or more crash sensors and a specially configured electronic control unit, the inflatable curtains are deployed, via inflation, into a deployed position in which they extend downwardly from their initial storage and mounting positions so as to substantially cover the side windows of the motor vehicle and thereby protect the torso and/or head of an occupant of the vehicle from injury through forcible impact with the side structure of the vehicle and/or by passing through a side window of the vehicle.

Whilst ICs have proved to be effective in protecting an occupant of a motor vehicle from injury via impact with the structure of the vehicle located proximate the occupant, they are generally ineffective in preventing injury in the event that the occupant's torso is urged towards the middle of the motor vehicle and thus away from an adjacent side structure of the motor vehicle—as would be the case, for example, for an occupant sitting in a left-hand seat of the motor vehicle in the event of a side impact from the right-hand side of the vehicle. Clearly, in such an accident situation, the inertia of the occupant's torso will cause the occupant's torso to move laterally towards the centre of the vehicle, which will thus be away from an immediately adjacent left-hand IC of the vehicle. Furthermore, the right-hand IC of the vehicle will be ineffective in protecting the seat occupant in question, because it is provided on the opposite side of the vehicle to that in which the occupant is sitting.

It has therefore been proposed to mount side airbag ("SAB") devices on both sides of a vehicle seat in order to protect an occupant of the seat in the case of impacts from either side of the motor vehicle. Such SABs may be mounted to a vehicle seat such that an airbag will deploy on either side of the seat in the event of a crash, as determined by one or more crash sensors. Such SABs have become common in recent years. Conventional SABs are arranged to deploy from respective side regions of the seat's backrest, and whilst this can provide useful protection for a seat occupant's torso, the occupant's neck and/or head is still left vulnerable to injury because the occupant's head remains substantially unrestrained in a side impact, oblique impact, or rollover type accident. It has therefore become common to install SABs in combination with ICs. However, even in such installations comprising both ICs and SABs, the problem still exists that the seat occupant may be provided with insufficient protection for his/her head in event of an impact which urges his/her torso and head towards the centre of the motor vehicle and thus away from the adjacent side structure of the motor vehicle where the adjacent IC is installed. There is therefore a need for an airbag arrangement which addresses this remaining problem.

Furthermore, automotive technology is advancing at an extremely fast rate, and in particular in the area of so-called 'autonomous driving'. As and when motor vehicles become capable of fully autonomous driving, it is envisaged that the designers of vehicle interiors will be released from conventional design constraints, and could begin designing vehicle seats which are very different to those which are common today and have been common for many years. For example, in a fully autonomous vehicle which is capable of driving under the management of its own computer systems, without inputs or management by a human driver, it is envisaged that the front seats of the vehicle could be configured to rotate or swivel about a vertical axis so that occupants of those seats could face rearwardly, or even at oblique angles relative to the direction of travel of the vehicle. In such arrangements, the conventional IC and/or SAB type of airbags which are common today may offer insufficient protection to the seat occupant when the vehicle seat is in a new position. For example, where a vehicle seat is positioned so that the occupant is facing in a direction which is oblique relative to the driving direction of the vehicle, then the IC installed in the side structure of the vehicle will not be positioned appropriately relative to the position of the seat to provide effective protection to the seat occupant.

SUMMARY

The present invention seeks to provide an improved vehicle seat equipped with an airbag unit to provide protection to an occupant of the seat in the event of a crash.

According to the present invention, there is provided a vehicle seat configured to support an occupant in a sitting position, the seat comprising: a squab, a backrest, and an airbag unit; the airbag unit comprising an inflatable airbag provided in an initially rolled and/or folded airbag package, and an inflator actuable to direct inflating gas into the airbag to inflate the airbag into an inflated configuration; the airbag comprising a pair of inflatable chambers; characterised in that the inflatable chambers are physically connected to one another via a connecting interface, and are fluidly isolated from one another; the airbag unit being mounted and configured such that, upon actuation of the inflator to inflate the airbag, the inflatable chambers inflate into respective deployed positions in which they: i) extend forwardly from respective opposing and laterally spaced-apart side regions of said backrest; and ii) extend upwardly, and laterally inwardly across an uppermost region of the seat towards the connecting interface, so as to thereby cooperate to define an inflated shroud around at least an uppermost region of the backrest so as to extend over the sitting position and provide lateral protection to a the occupant of the seat in the sitting position.

Optionally, the inflatable chambers are configured to abut and bear against one another across the connecting interface when in their respective deployed positions.

Conveniently, the connecting interface between the inflatable chambers is defined by a seam of the airbag.

Optionally, the inflatable chambers are configured to be spaced apart from one another by the connecting interface when in their respective deployed positions.

Advantageously, said airbag is one-piece woven, and s the aid connecting interface is defined by a region of the airbag in which the yarns of two constituent fabric layers of the airbag are interwoven.

Optionally, said connecting interface between the inflatable chambers is substantially linear.

Conveniently, the airbag is substantially mirror-symmetrical about sa the id connecting interface between the inflatable chambers.

Alternatively, the airbag is asymmetrical about the connecting interface between the inflatable chambers.

Optionally, each the inflatable chamber comprises a plurality of fluidly interconnected inflatable cells.

The inflatable cells of each inflatable chamber may be defined either by i) seams of the airbag, or ii) by regions of the airbag in which yarns of two constituent fabric layers of the airbag are interwoven.

Conveniently, an upper region of each inflatable chamber comprises a head cell, and a lower region of each inflatable chamber comprises a thorax cell.

Advantageously, an upper region of each inflatable chamber comprises a front cell which is configured to deploy into an inflated position located at the front of the inflatable chamber and which is spaced forwardly from the backrest by a rear inflatable region of the inflatable chamber, wherein the airbag unit further comprises a pair of tethers, each tether being connected to a respective the front cell and configured to become taut during inflation of the airbag from the airbag package into the inflated configuration to thereby draw the respective front cell inwardly and/or downwardly during inflation of the airbag so as to at least partially close an upper region of the shroud around the sitting position.

Optionally, each the front cell is fluidly connected to the rear inflatable region of the respective inflatable chamber by a flow port which is located adjacent the connecting interface between the inflatable chambers.

Conveniently, each the head cell is configured to deploy into an inflated position between a respective the front cell and the backrest, the front cell and the head cell of each inflatable chamber being fluidly interconnected by a respective flow port which is located adjacent the connecting interface between the inflatable chambers.

Advantageously, each the inflatable chamber has a respective inlet region comprising an inlet port through which a respective volume of inflating gas is directed.

Optionally, each the inflatable chamber comprises a respective internal gas guide positioned within its inlet region, the gas guide having an inlet opening configured to receive an inflator configured to produce inflating gas or to otherwise receive a flow of inflating gas into the gas guide, a first outlet opening configured to direct some of said inflating gas towards a lower region of the inflatable chamber, and a second outlet opening configured to direct some of the inflating gas towards an upper region of the inflatable chamber, wherein the first outlet opening is larger than the second outlet opening.

Conveniently, the first outlet opening is directed towards or is positioned within the thorax cell, and the second outlet opening is directed towards or is positioned within the head cell.

The airbag unit may comprise a single the inflator which is fluidly connected to both the inlet ports.

Alternatively, the airbag unit comprises two discrete inflators, each inflator being fluidly connected to a respective the inlet port.

DRAWINGS

So that the invention may be more readily understood, and so that further features thereof may be appreciated, embodiments of the invention will now be described by way of example with reference to the accompanying drawings in which.

DETAILED DESCRIPTION

Figure 1:
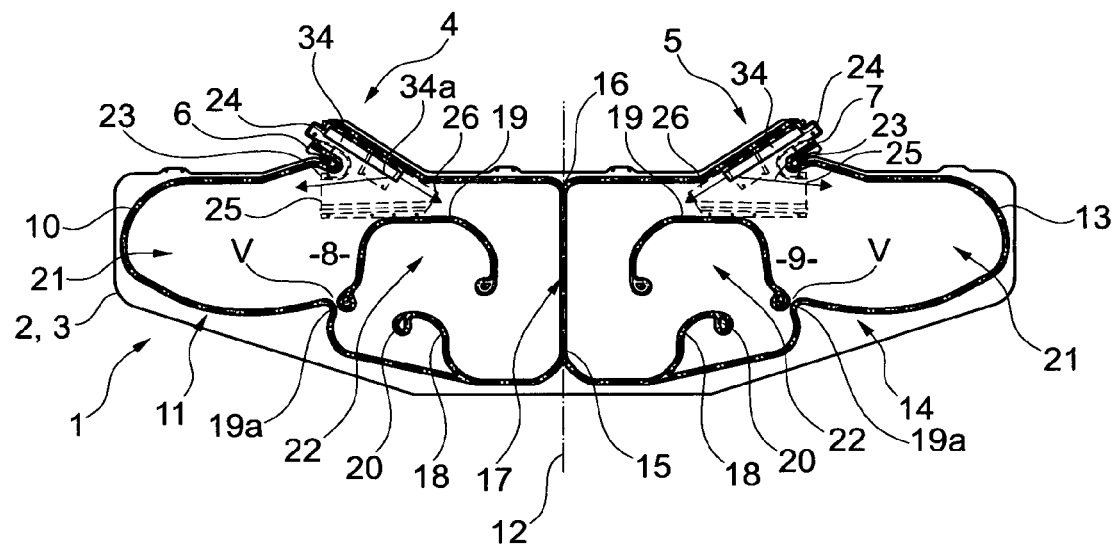
FIG. 1 is a plan view of an unpackaged airbag which is suitable for installation in a vehicle seat in accordance with the present invention.

Referring initially to FIG. 1, there is shown an uninflated airbag 1 suitable for installation in a vehicle seat in accordance with the present invention. The airbag 1 illustrated is shown in an exemplary and relatively simple form to clearly illustrate aspects of the invention. However, as will be explained in more detail below, other more complex airbag configurations may be used instead.

The airbag 1 is elongate in overall configuration and may be formed from two substantially identical sheets 2, 3 of flexible material, such as woven fabric, which are superimposed on one another and interconnected by a number of seams so to define therebetween a large internal inflatable volume for the receipt of inflating gas from one or more inflators. As will be noted from FIG. 1, the sheets 2, 3 are elongate in form, and can be considered to be very generally rectangular in overall shape. The particular airbag 1 illustrated is configured to receive inflating gas from two discrete inflators, as will be described in more detail below, and is thus configured to have two inlet regions 4, 5 for cooperation with respective inflators. Each inlet region 4, 5 comprises a respective neck 6, 7 which is formed from cooperating and correspondingly-shaped protrusions of the two constituent sheets 2, 3 of flexible material.

The seams interconnecting the two sheets 2, 3 of flexible material are configured in such a way that the internal inflatable volume defined between the sheets 2, 3 is divided into two discrete inflatable chambers, indicated generally at 8 and 9 in FIG. 1. The inflatable chambers 8, 9 are of substantially equal physical size and have substantially equal inflatable volumes, with each representing a respective half of the airbag 1.

The left-hand inflatable chamber 8 (in the orientation of the airbag 1 illustrated in FIG. 1) is defined by a left-hand peripheral seam 10, which runs from one side of the left-hand neck 6, around a peripheral region of the left-hand region of the airbag 1 (in a somewhat tortuous or serpentine path indicated generally at 11), substantially along a central transverse axis 12 of the airbag in a straight line, and then along the periphery of the airbag 1 until it terminates at the opposite side of the left-hand neck 6. The two sheets 2, 3 are unconnected between the start and end points of the peripheral seam 10, such that the end of the neck 6 remains open and thereby defines an inlet port for the receipt of an inflator in a manner known per se.

The right-hand inflatable chamber 8 (in the orientation of the airbag 1 illustrated in FIG. 1) is defined by a right-hand peripheral seam 13 of similar configuration to the left-hand peripheral seam 10 described above. As will therefore be noted, the right-hand seam runs from one side of the right-hand neck 7, around a peripheral region of the right-hand region of the airbag 1 (in a somewhat tortuous or serpentine path indicated generally at 14), substantially along the central axis 12 of the airbag in a straight line, and then along the periphery of the airbag 1 until it terminates at the opposite side of the right-hand neck 7. The two sheets 2, 3 are unconnected between the start and end points of the peripheral seam 13, such that the end of the neck 7 remains open and thereby defines an inlet port for the receipt of an inflator in a manner known per se.

In the configuration described above, it will be appreciated that the two peripheral seams 10, 13 both extend substantially along the central axis 12 of the airbag 1. In some embodiments it is envisaged that the two peripheral seams 10, 13 will be superimposed along the axis 12 so as to create a double seam in that area. In other embodiments, however, it is envisaged that the two peripheral seams 10, 13 may each extend alongside the exact position of the axis 12, so as to be located on opposite sides of the axis 12 and generally adjacent one another. Other configurations are also envisaged in which only one of the peripheral seams 10, 13 will actually extend across the airbag 1 in the region of the axis 12, with the other peripheral seam stopping at a point where it meets the axis 12 (e.g. at 15 in FIG. 1) and then starting again at a point where it turns away from the axis 12 (e.g. at 16 in FIG. 1). In such an arrangement, the seam 10, 13 which extends along the axis 12 will thus serve to define both inflatable chambers 8, 9, in the region of the axis 12.

The region of the or each peripheral seam 10, 13 which extends along the axis 12 of the airbag thus serves to divide the airbag's total inflatable volume into the two inflatable chambers 8, 9. Furthermore, in the region of the axis 12, the region of the or each peripheral seam 10, 13 also defines a connecting interface 17 which serves to physically interconnect the two inflating chambers 8, 9, whilst fluidly isolating the chambers 8, 9 from one another.

In addition to their respective peripheral seams 10, 13, each inflatable chamber 8, 9 may include one or more additional seams which also interconnect the two sheets 2, 3 of the airbag 1. In the arrangement of FIG. 1, the additional seams of each chamber 8, 9 include a respective relatively short front seam 18, and a somewhat longer central seam 19. Each front seam 18 extends from a front region of a respective peripheral seam 10, 13 generally proximate the central axis 12, towards a central region of the respective chamber 8, 9 in a somewhat S-shaped configuration and terminates at an end 20 which is located within the periphery of the respective inflatable chamber 8, 9. Each central seam 19 extends between two ends which are both located within the periphery of the respective inflatable chamber 8, 9, and has a generally n-shaped configuration as viewed in the orientation of FIG. 1. One end 19a of each central seam 19 is positioned proximal to a respective peripheral seam 10, 13 of the airbag, so as to be spaced a short distance from the peripheral seam 10, 13, thereby defining a gap between the end 19a of the central seam and the peripheral seam 10, 13. In the particular embodiment illustrated in FIG. 1, the end 19a of each central seam 19 is actually proximal to a somewhat re-entrant region of the adjacent peripheral seam 10, 13.

As will be appreciated by those of skill in the art of motor vehicle airbags, the additional seams 18, 19 are effective to sub-divide each inflatable chamber 8, 9 into a plurality of fluidly interconnected inflatable cells. In the airbag configuration illustrated in FIG. 1, each central seam 19 serves to divide the respective inflatable chamber into a thorax cell 21 located towards the respective end of the airbag, and a head cell 22 located towards the central region of the airbag. Each front seam 18 further sub-divides the head cell 22 of the respective inflatable chamber 8, 9 in order to provide a desired inflation characteristic to the airbag 1. The function and deployment of the various cells will become clear hereinafter. Additionally, it is to be noted that the terminal end 19a of each central seam, and the respective adjacent peripheral seam 10, 13 cooperate to define a small vent aperture V between the thorax cell 21 and the head cell 22 of the respective inflatable chamber 8, 9, the purpose of which is described hereinafter.

The airbag 1 further comprises a pair of internal gas guides 23, each being provided within a respective inlet region 4, 5 of the airbag. The gas guides 23 are each formed from fabric material and have a generally Y-shaped configuration. Each gas guide has an inlet opening 24 which is aligned with a respective inlet port of the airbag 1 and is configured to receive therein a respective inflator such as a gas generator. Each gas guide 23 further comprises a first outlet opening 25 which is directed generally towards a respective end region of the airbag, and a second outlet opening 26 which is directed generally towards the central transverse axis 12 of the airbag adjacent and rearward of a respective central seam 19. The two outlet openings 25, 26 of each gas guide are thus oppositely directed. The first outlet opening 25 is configured to be larger in dimension than the second outlet opening 26.

As will be appreciated by those of skill in the art of airbag manufacture, although the airbag 1 has been described above as being formed from two separate sheets 2, 3 of flexible material which are interconnected via a series of (for example, stitched) seams, it is envisaged that in variants of the invention the two sheets 2, 3 could be woven simultaneously via a so-called "one-piece weaving" technique, known per se, in which the warp and weft yarns forming the two layers 2, 3 are interwoven in selected areas to form interconnecting webs which are integral to the woven structure of the two sheets. In such an arrangement, it is envisaged that the resulting webs of interwoven warp and weft yarns may be provided in similar regions and have similar configurations to the above-described seams 10, 13, 18, 19, and will thus effectively replace the seams. In such a one-piece woven airbag, the connecting interface, 17 which serves to physically interconnect the two inflatable chambers 8, 9 whilst fluidly isolating them from one another, will be defined by a region of the airbag in which the yarns of the two constituent fabric layers of the airbag are interwoven.

Figure 2:
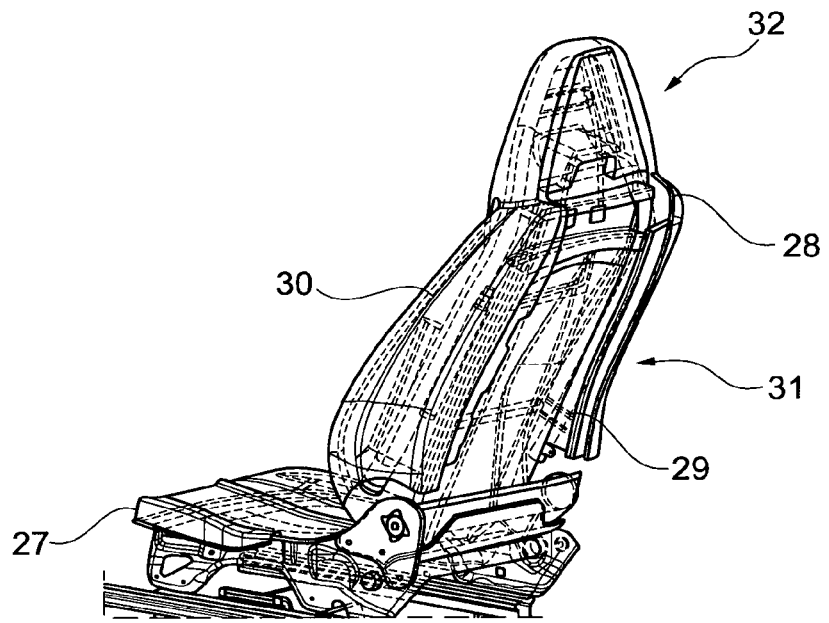
FIG. 2 is a schematic isometric view of a vehicle seat in accordance with the invention, showing the seat from the rear and one side in a normal condition, prior to inflation of the airbag.
Figure 3:
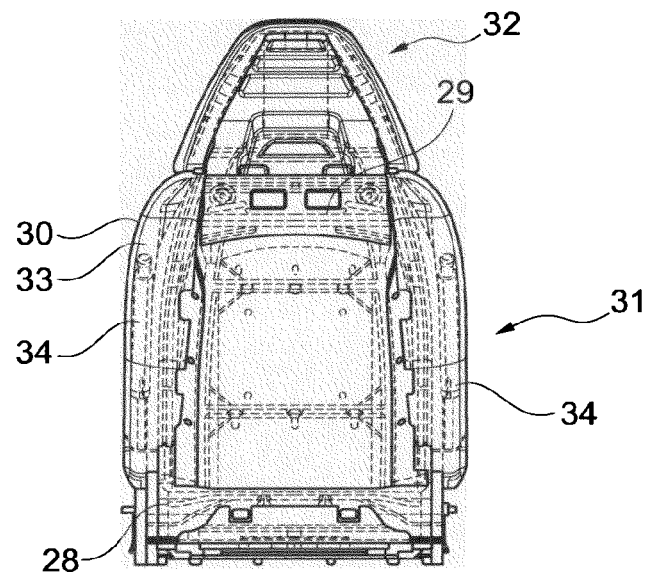
FIG. 3 is an elevational view from the rear of the seat illustrated in FIG. 2.

Turning now to consider FIGS. 2 and 3, there is illustrated a motor vehicle seat in accordance with the present invention, which is equipped with an airbag unit comprising an airbag 1 of the type described above and illustrated in FIG. 1. As is conventional, the seat comprises a squab 27 and a backrest 28, the backrest 28 extending generally upwardly from a rear region of the squab 27. As will be appreciated, the squab 27 and the backrest 28 cooperate to support an occupant in a conventional sitting position. The squab 27 and the backrest 28 both comprise an internal structure which may take the form of a metal frame, which is covered in upholstery. FIG. 2 shows the squab without its upholstery, but shows the backrest comprising a backrest frame 29 which supports upholstery 30 comprising a pair of laterally opposed side-bolsters in a conventional manner.

The backrest 28 of the seat illustrated in FIGS. 2 and 3 comprises a lowermost abdominal region 31 and a headrest 32, the headrest 32 being positioned at the uppermost region of the backrest 28 and being configured to restrain the head of an occupant of the seat in a known manner. In the embodiment illustrated in FIG. 32, the headrest 32 is provided as an integrally formed part of the backrest 28, such that the backrest frame 29 defines both the abdominal region 31 and the headrest 32.

The seat is equipped with an airbag unit which comprises the airbag 1 illustrated in FIG. 1. The airbag 1 is initially provided in a rolled and/or folded package 33 and is mounted to the backrest frame 29 inside the backrest upholstery 30. In more detail, it will be appreciated that a discrete inflator 34 is inserted into the inlet opening 24 of each gas guide 23 of the airbag, and the airbag is rolled and/or folded into an elongate package 33 (such as, for example, by rolling the airbag of FIG. 1 about a longitudinal axis), after which the package 33 is mounted to the backrest frame 29 so as to extend around the frame, on the forwardly-facing side of the frame 29. Importantly, the airbag package 33 extends from one lateral side of the frame 29, around and over the headrest 32, to the opposite lateral side of the frame 29. It is proposed that each inflator 34 will be securely fastened to a respective lateral region of the backrest frame 29, for example via one or more mounting spigots which extend through respective mounting apertures (not shown) formed in the inlet regions 4, 5 of the airbag in a manner known per se, so as to anchor the inlet regions 4, 5 of airbag 1 relative to the backrest frame 29. It is furthermore proposed that the airbag 1 may be provided with mounting tabs for attachment to the backrest frame 29 when rolled and/or folded into the package 33, to provide additional securement to the backrest frame 29. In other arrangements it is envisaged that the airbag package 33 may additionally comprise a rupturable wrapper or covering provided around the rolled and/or folded airbag 1, and that the wrapper or cover may also be mounted to the backrest frame 29 (for example via mounting tabs) to further secure the airbag 1 to the backrest frame 29.

Having regard to FIG. 1 once more, a pair of inflators 34 are illustrated in position within respective gas guides 23, having each been inserted through the inlet opening 24 of the respective gas guide 23. As will be observed, the inflators 34 are of substantially identical configuration to one another, with each having an elongate and generally cylindrical form. Each inflator 34 comprises a plurality of radially outwardly directed gas outlet ports 34a arranged circumferentially around one end, and is positioned within the respective gas guide 23 such that the gas outlet ports 34a are positioned generally between the first and second outlet openings 25 and 26 of the gas guide 23.

Figure 4:
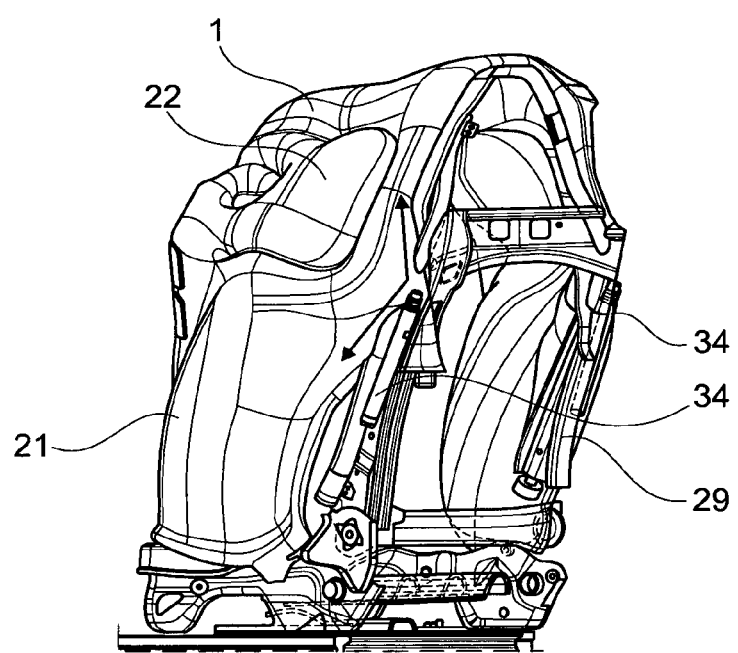
FIG. 4 is an isometric view corresponding generally to that of FIG. 2, but which shows the vehicle seat in a condition in which the airbag has been deployed via inflation.

FIGS. 4 to 8 illustrate the vehicle seat in a condition in which the airbag 1 has been deployed via actuation of the inflators 34. For clarity, FIG. 4 shows the airbag 1 in its fully inflated deployed configuration and in the absence of any upholstery, whilst FIGS. 5 to 8 show the squab and backrest upholstery 30 in place.

As will be appreciated by those of skill in the art of motor vehicle airbags, actuation of the inflators 34 is effective to rapidly produce a large volume of inflating gas which is directed through the outlet ports 34a of the inflator 34 and into the internal inflatable volume of the airbag 1, via the respective internal gas guides 23, so as to cause the airbag to inflate very rapidly. Upon inflation, the airbag 1 deploys from the backrest frame 29 in a generally forwards direction towards the front edge of the squab 27 remote from the backrest 28. In so doing, the airbag 1 will rupture or otherwise burst through the upholstery 30 of the backrest 28, for example via pre-formed tear seams or other areas of relative mechanical weakness in the upholstery 30.

In more detail, inflating gas is ejected from each inflator 34 via its outlet ports 34a within the respective gas guide 23. The gas guide 23 serves to split the resulting flow of gas such that some of the inflating gas is directed out of the gas guide through the first outlet opening 25 (see FIG. 1) and into the respective thorax cell 21, and some of the inflating gas is directed out of the gas guide through the second opening 26 and into the respective head cell 22, as denoted by the arrows in both FIGS. 1 and 4. Because the first outlet opening 25 of each gas guide 23 is larger than the second outlet 26, a larger proportion of the gas is directed through the first outlet opening 25 than through the second outlet opening 26, such that the thorax cells 21 will inflate more rapidly than the head cells 22. This arrangement is thus configured to ensure that the thorax cells 21 will achieve substantially complete inflation more rapidly than the head cells 22. This inflation characteristic is considered particularly desirable in the event of a side impact, due to the very small space between the vehicle seat and the adjacent side structure of the motor vehicle, and the resulting need to provide effective protection to the thorax of a seat occupant extremely quickly. Nevertheless, rapid inflation of the head cells 22 is also desirable. As will thus be appreciated, when the thorax cells 21 become substantially fully inflated, gas is permitted to vent from the thorax cells 21 into the head cells 22 via the vent apertures V therebetween, thereby supplementing the flow of gas into head cells 22 directly from the gas guide 23 with a small additional flow of excess gas from the thorax cells 21. Additionally, the vent apertures V perform an important function in the event that either of the thorax cells 21 is impacted and thus compressed by the seat occupant's body in the event of an accident involving a component of lateral force. In particular, the vent apertures V permit inflating gas within the thorax cells 21 to vent upwardly into the head cells 22 as the thorax cells become compressed under the force of the occupant's body, thereby allowing the thorax cells 21 to provide cushioning effect to the occupant, whilst also thereby further increasing the inflation rate of the head cells 22.

Figure 5:
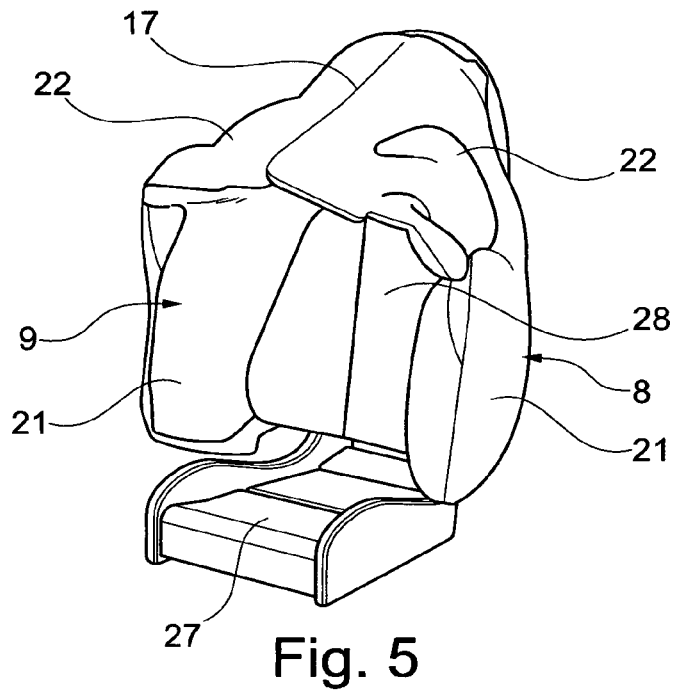
FIG. 5 is a schematic isometric view from the front and one side, showing the seat with the airbag in its deployed configuration.

As illustrated most clearly in FIG. 5, the two inflatable chambers 8, 9 of the airbag 1 inflate into respective deployed positions in which they: i) extend forwardly from respective opposing and laterally spaced-apart side regions of the backrest 28; and ii) extend upwardly, and laterally inwardly across an uppermost region of the seat, as defined by the head rest 32, towards the connecting interface 17 between the two chambers 8, 9. More particularly, the regions of the inflatable chambers 8, 9 defining the respective thorax cells 21 extend forwardly from respective opposing and laterally spaced-apart side regions of the backrest 28, and the regions defining the head cells 22 extend upwardly and laterally inwards across the head rest 32. In this manner, the two inflatable chambers 8, 9 cooperate to define an inflated shroud around the backrest 28, and its head rest 32, so as to extend over an occupant's sitting position and provide lateral protection to the occupant of the seat in the sitting position.

Figure 6:
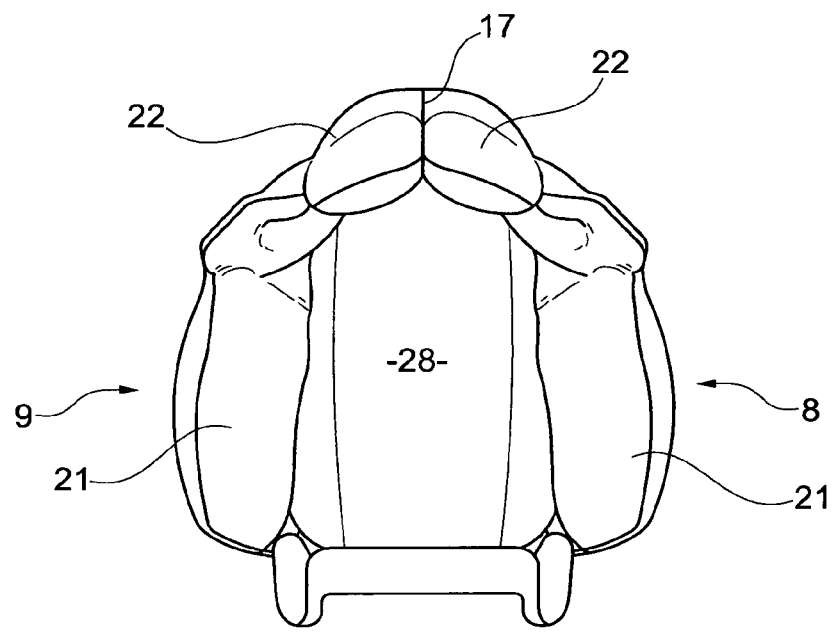
FIG. 6 is an elevational view from the front of the seat illustrated in FIG. 5.
Figure 7:
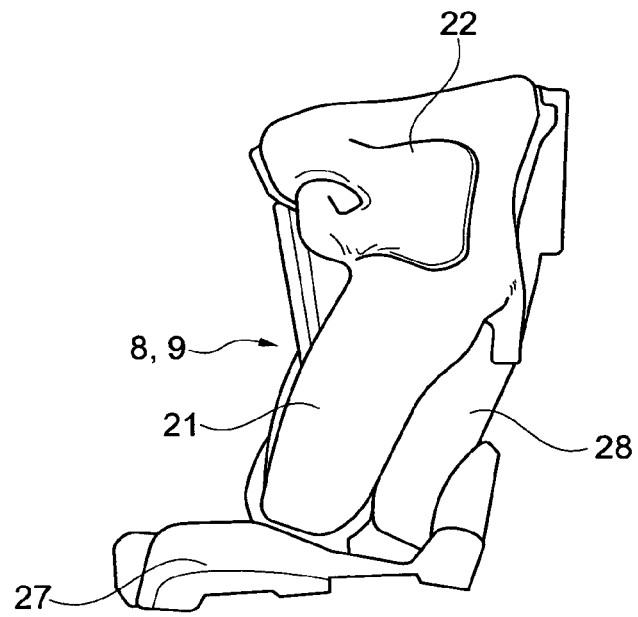
FIG. 7 is an elevational view from the side of the seat illustrated in FIGS. 5 and 6.
Figure 8:
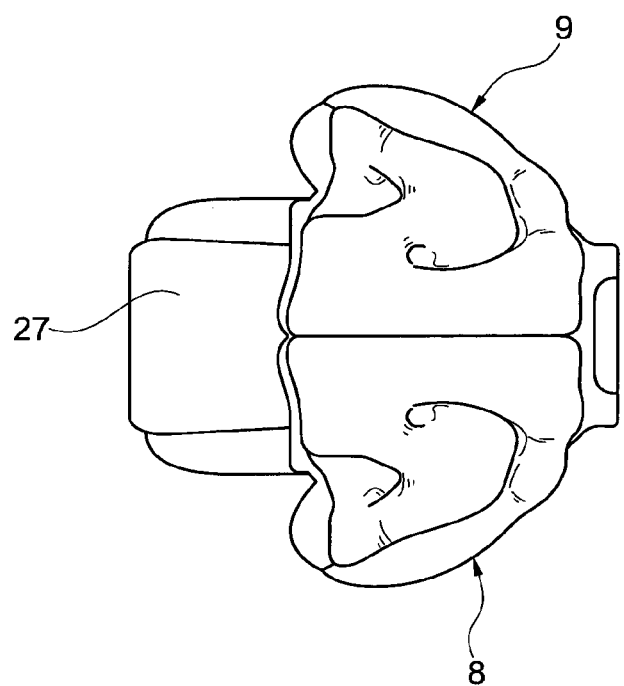
FIG. 8 is a plan view from above the seat illustrated in FIGS. 5 to 7.

As illustrated most clearly in FIG. 6, the airbag 1 inflates into a deployed position in which the connecting interface 17 between the two inflatable chambers 8, 9, extends substantially centrally above the seat, so to lie at least approximately within the sagittal plane of an occupant sitting centrally on the seat in a normal sitting position. Furthermore, because the connecting interface 17 is narrow in this embodiment, the airbag 1 is configured such that the inflatable chambers 8, 9 abut and bear against one another across the connecting interface when inflated in their respective deployed positions. This allows the head cell region of each inflatable chamber 8, 9 to support the other when inflated.

As will be appreciated, when the airbag 1 is in its fully inflated and deployed configuration, the shroud that it defines will serve to provide lateral protection to an occupant of the seat in a side impact or oblique impact crash, regardless of which side of the vehicle the crash occurs, and will also serve to provide protection to the occupant in the event of a rollover accident. Additionally, because the airbag 1 is mounted solely to the vehicle seat, then the resulting shroud will always deploy into the same position relative to the seat, regardless of the position in which the seat is located. This arrangement therefore ensures reliable deployment of the airbag regardless of the position of the seat within the cabin of a motor vehicle, which could offer very significant advantages in the sort of fully autonomous vehicles envisaged above, as it would permit the seat to be mounted for rotation within the cabin of the motor vehicle whilst ensuring effective protection to the seat occupant.

Because the total inflatable volume of the airbag 1 is effectively divided into two inflatable chambers 8, 9 of at least approximately equal physical size and inflatable volume, with each being inflated by a substantially identical respective inflator 34, the airbag 1 may be reliably tested during development by inflating only one of the two inflatable chambers 8, 9, and thus only one half of the complete airbag 1, since both inflatable chambers 8, 9 are substantially identical.

Although the invention has been described above with specific reference to a particular embodiment, it is to be appreciated that various modifications may be made without departing from the scope of the present invention. For example, whilst the airbag 1 described above is configured so as to be substantially mirror-symmetrical about the central transverse axis 12, and thus effectively mirror-symmetrical about the connecting interface 17 between the two inflatable chambers 8, 9, this is not essential.

Figure 9:
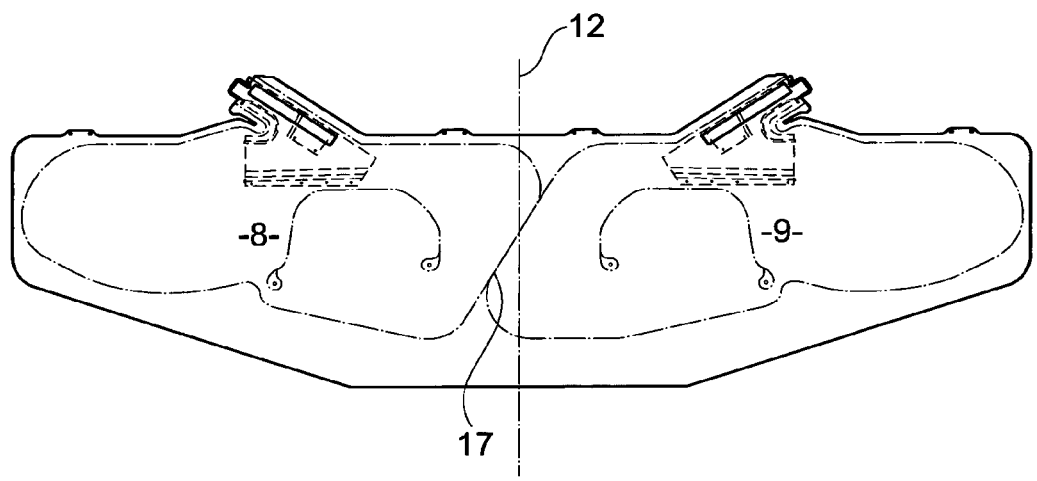
FIG. 9 is a plan view corresponding generally to that of FIG. 1, but which shows an alternative configuration of an airbag suitable for installation in a vehicle seat according to the invention.

FIG. 9 illustrates an alternative configuration of airbag 1 which may be used in the present invention, and which is similar to that described above and illustrated in FIG. 1 in most respects. The same reference numbers are therefore used to denote identical or equivalent features of the airbag. Instead of being symmetrical about its central transverse axis 12, the airbag 1 of FIG. 9 is actually asymmetrical about its transverse axis 12. As will be noted, in this configuration, the connecting interface 17 between the two inflatable chambers 8, 9 extends diagonally across the central region of the airbag 1, so as to make an acute angle with the central axis 12. Nevertheless, it is proposed to configure the chambers 8, 9, and the connecting interface 17 such that the inflatable chambers 8, 9 will still have substantially equal inflatable volumes, thereby preserving the advantage of permitting the airbag 1 to be reliably tested during development by inflating only one of the two inflatable chambers 8, 9, and thus only one half of the complete airbag 1. The resulting airbag 1 is thus asymmetrical about the connecting interface 17 between the inflatable chambers 8, 9.

Figure 10:
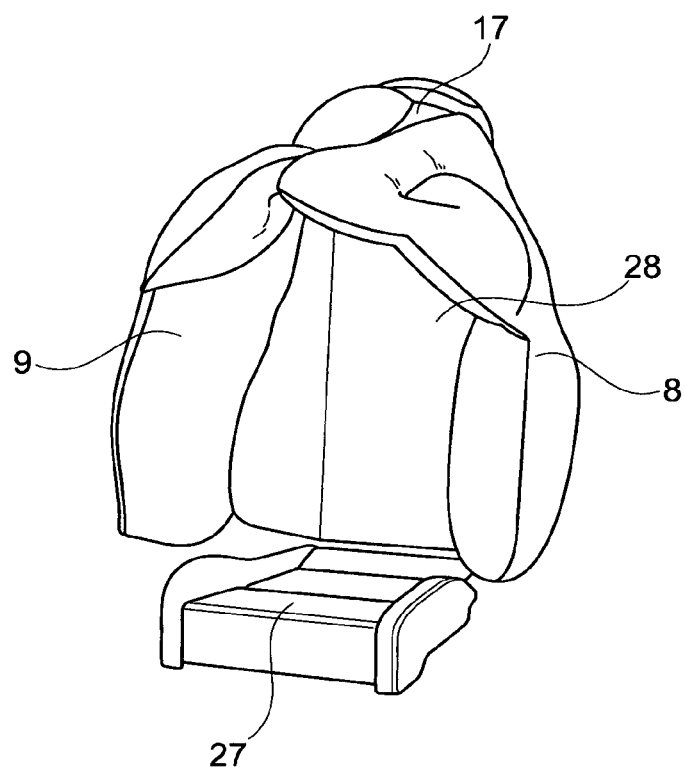
FIG. 10 is a schematic isometric view from the front and one side, showing a vehicle seat equipped with the airbag of FIG. 9, and with the airbag in a deployed configuration.
Figure 11:
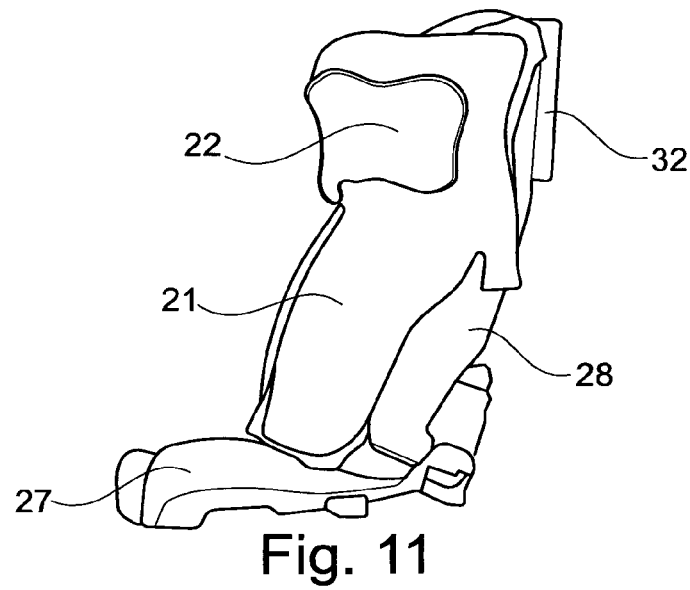
FIG. 11 is an elevational view from the side of the seat illustrated in FIG. 10.

FIGS. 10 and 11 illustrate the modified airbag of FIG. 1 in its deployed and substantially fully inflated condition in relation to the vehicle seat, upon actuation of the two inflators 34. As will be appreciated, the airbag 1 of FIG. 9 inflates and deploys in a substantially identical manner to the airbag of FIG. 1. The inflatable chambers 8, 9 of the airbag 1 thus again inflate into respective deployed positions in which they: i) extend forwardly from respective opposing and laterally spaced-apart side regions of the backrest 28; and ii) extend upwardly, and laterally inwardly across an uppermost region of the seat, as defined by the head rest 32, towards the connecting interface 17 between the two chambers 8, 9. More particularly, the regions of the inflatable chambers 8, 9 defining respective thorax cells 21 extend forwardly from respective opposing and laterally spaced-apart side regions of the backrest 28, and the regions defining the head cells 22 extend upwardly and laterally inwards across the head rest 32. In this manner, the two inflatable chambers 8, 9 cooperate to define an inflated shroud around the backrest 28 and its head rest 32 so as to extend over an occupant's sitting position and provide lateral protection to a the occupant of the seat in the sitting position.

As illustrated most clearly in FIG. 10, the modified airbag 1 of FIG. 9 inflates into a deployed position in which the connecting interface 17 between the two inflatable chambers 8, 9, extends diagonally across the top of the seat, whilst nevertheless still being located generally centrally with respect to the lateral width of the seat. Furthermore, because the connecting interface 17 is still narrow, the airbag remains configured such that the inflatable chambers 8, 9 abut and bear against one another across the connecting interface when in their respective deployed positions. This allows the head cell region of each inflatable chamber 8, 9 to support the other when inflated, in substantially the same manner as with the airbag of FIG. 1.

Figure 12:
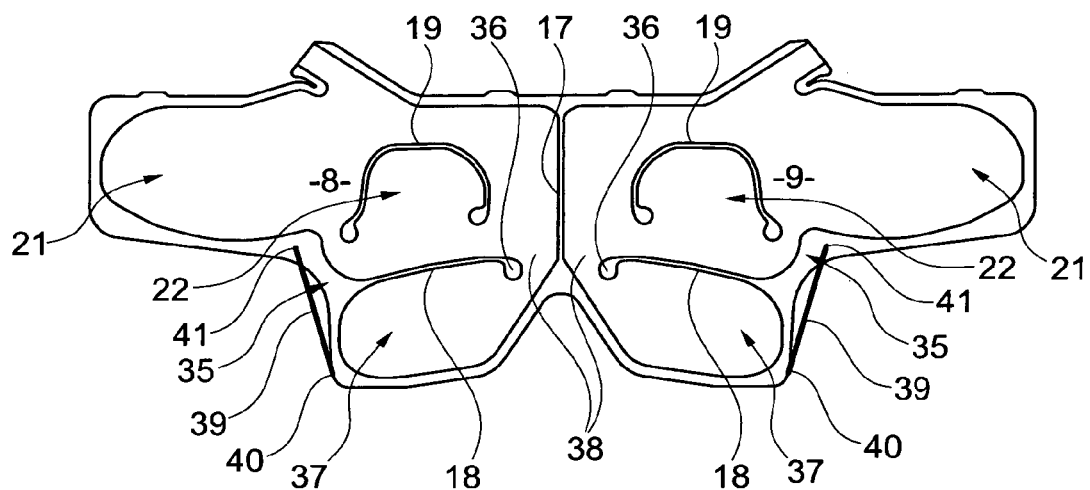
FIG. 12 is a plan view corresponding generally to those of FIGS. 1 and 9, but which shows another alternative configuration of an airbag suitable for installation in a vehicle seat according to the invention.

Turning now to consider FIG. 12, there is illustrated another variation of the airbag 1, which is again similar in many respects to the airbag illustrated in FIG. 1. The same reference numbers are therefore used once more to denote identical or equivalent features of the airbag, although it is to be noted that the internal gas guides 23 shown in FIG. 1 are omitted from FIG. 12 simply for clarity; it is proposed that substantially identical gas guides 23 will also be used with the airbag of FIG. 12.

One of the principal differences between the airbag of FIG. 12 and the one shown in FIG. 1 is that the modified airbag of FIG. 12 is shaped and configured such that its two inflatable chambers 8, 9 (which are again separated by a connecting interface 17 of similar form and which is substantially coincident with a transverse axis of mirror-symmetry 12 of the airbag 1) are generally L-shaped and arranged in back-to-back relationship, with their short limbs arranged adjacent one another across the connecting interface 17, and their long limbs extending away from one another and away from the transverse axis 12 in opposite directions. Furthermore, it will be noted that the front seam 18 of each inflatable chamber 8, 9 is arranged to extend from the general region of the corner 35 which is formed between the short limb of the respective inflatable chamber 8, 9 and its long limb, towards the central connecting interface 17, and to terminate at an end 36 which is spaced a short distance from the connecting interface 17. The central seams 19 of each inflatable chamber 8, 9 are of substantially identical form as those of the airbag illustrated in FIG. 1.

The front seams 18 of the airbag illustrated in FIG. 12 serve to define a respective front cell 37 of each respective inflatable chamber 8, 9. Each front cell 37 is fluidly connected to a rear region of the respective head cell 22 by a respective flow port 38 which is defined between the connecting interface 17 and the end 36 of the respective front seam 18. The flow ports 38 are thus both located adjacent the connecting interface 17 between the two inflatable chambers 8, 9.

Another principal difference between the airbag illustrated in FIG. 12 and the airbag illustrated in FIG. 1 is that the airbag of FIG. 12 is equipped with a pair of flexible tethers 39. Each tether 39 is associated with a respective inflatable chamber 8, 9, is elongate in form and may, for example, be formed from a thin length of woven webbing or the like. Each tether 39 is secured at its front end 40 to a front corner of a respective front cell 37, distal to the connecting interface 17, and at its rear end 41 to the long limb of the respective inflatable chamber 8, 9, generally adjacent the corner 35.

Figure 13:
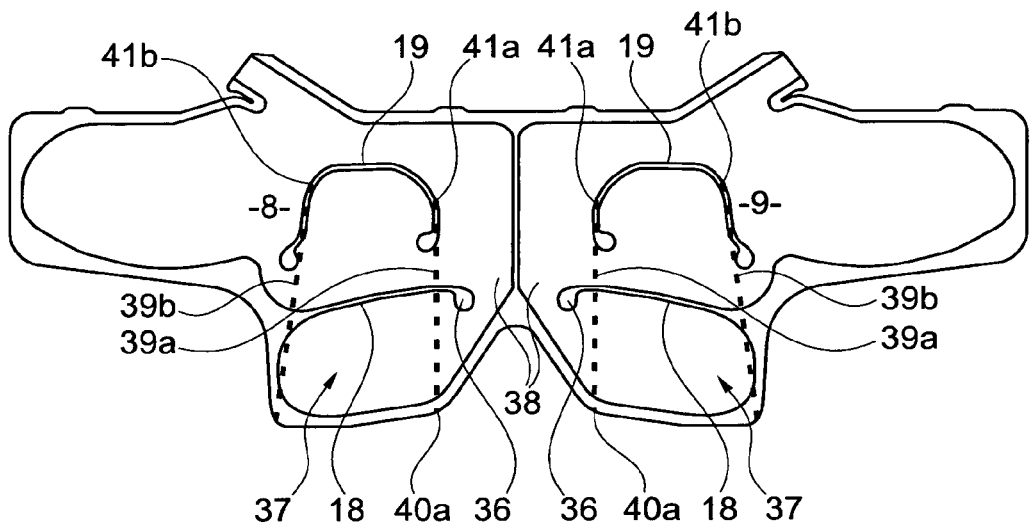
FIG. 13 is another plan view, corresponding generally to that of FIG. 12, but which shows a further variation of an airbag suitable for installation in a vehicle seat according to the present invention.

FIG. 13 illustrates an airbag having a slightly different tether configuration, in which each inflatable chamber 8, 9 is associated with a respective pair of tethers 39. In this arrangement, each pair of tethers comprises an inner tether 39a and an outer tether 39b. Each inner tether 39a is secured at its front end 40a to a front region of the respective head cell 37 at a position proximate the connecting interface 17, and at its rear end 41a to a region of the respective central seam 19 proximate the connecting interface 17. Each outer tether 39b is secured at its front end to a front corner of the respective front cell 37, distal to the connecting interface 17, and at its rear end 41b to a region of the central seam distal to the connecting interface 17.

The tethered airbag arrangements of FIGS. 12 and 13 are both designed to give the airbag 1 a modified inflation characteristic, as will now be described with reference to FIGS. 14 to 18.

Figure 14:
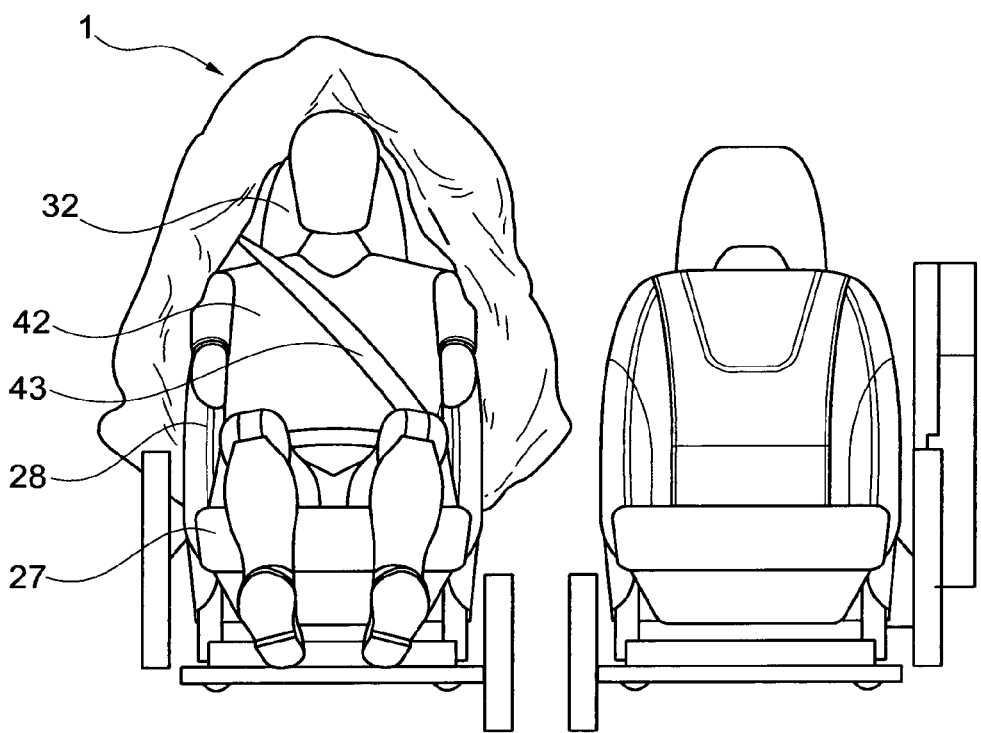
FIG. 14 is a schematic front elevational view of a seat in accordance with the present invention, the seat being occupied by a seat occupant in a typical sitting position, and showing an airbag of the type shown in FIG. 12 or 13 during an initial stage of deployment in response to a side or oblique impact.

FIG. 14 illustrates the airbag 1 during an initial stage of deployment in response to a side or oblique impact from the left-hand side of the drawing. The seat which is equipped with the airbag 1 is shown alongside another vehicle seat, which may be of substantially identical configuration and which may also be equipped with a similar airbag. The seat is also illustrated supporting a seat occupant 42 in a generally conventional sitting position, and wearing a seat-belt 43. As will be appreciated, the airbag 1 is illustrated developing into the shroud configuration as described in detail above, such that the shroud can be seen developing around the seat occupant's 42 sitting position.

Figure 15:
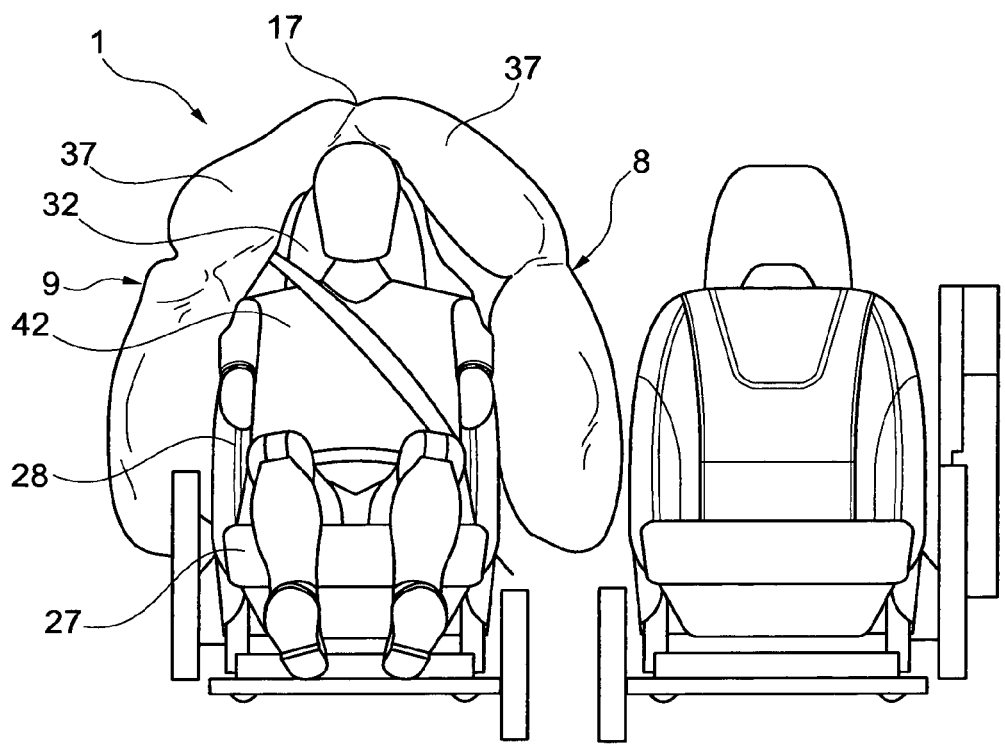
FIG. 15 is a view corresponding generally to that of FIG. 14, but which shows the airbag during a subsequent stage of deployment.

FIG. 15 illustrates the airbag 1 during a subsequent stage of deployment, and thus shows the airbag 1 in a more complete stage of inflation. In this drawing, it will be noted that the inflatable chambers 8, 9 are shown inflating towards their respective deployed positions in which they: i) extend forwardly from respective opposing and laterally spaced-apart side regions of the backrest 28; and ii) extend upwardly, and laterally inwardly across an uppermost region of the seat, as defined by the head rest 32, towards the connecting interface 17 between the two chambers 8, 9. More particularly, the front cells 37 can be seen developing towards respective inflated positions at the front of the airbag 1, around the sides of the headrest 32.

Figure 16:
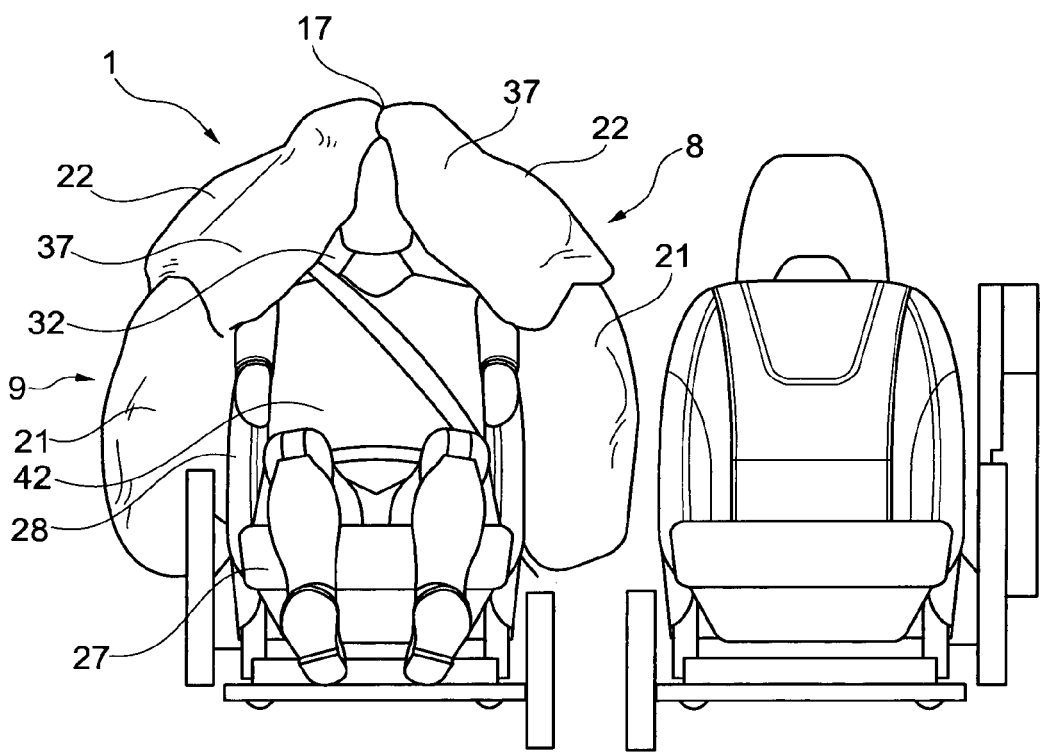
FIG. 16 is view corresponding generally to that of FIG. 15, but which shows the airbag in a further subsequent stage of deployment.
Figure 17:
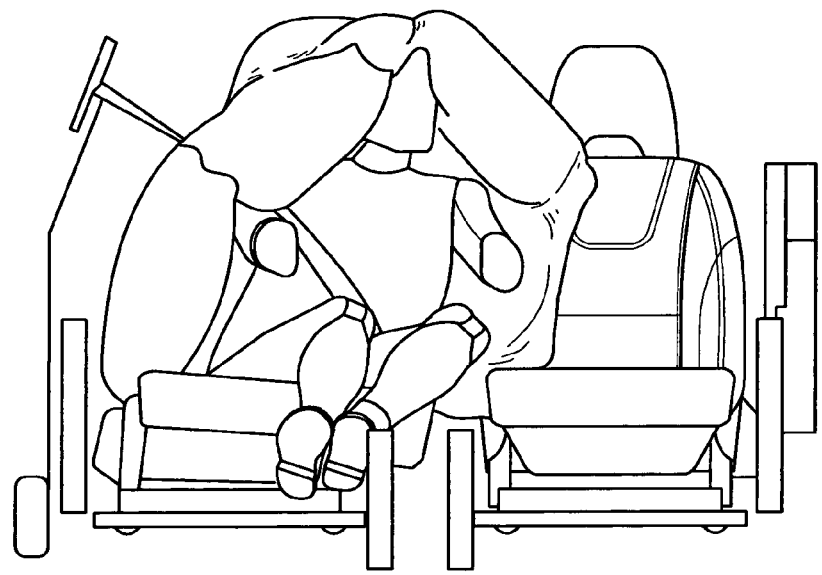
FIG. 17 is a view corresponding generally to that of FIG. 16, but which shows the airbag in a substantially fully deployed condition, and the seat and occupant subject to impact forces arising from a side or oblique impact.
Figure 18:
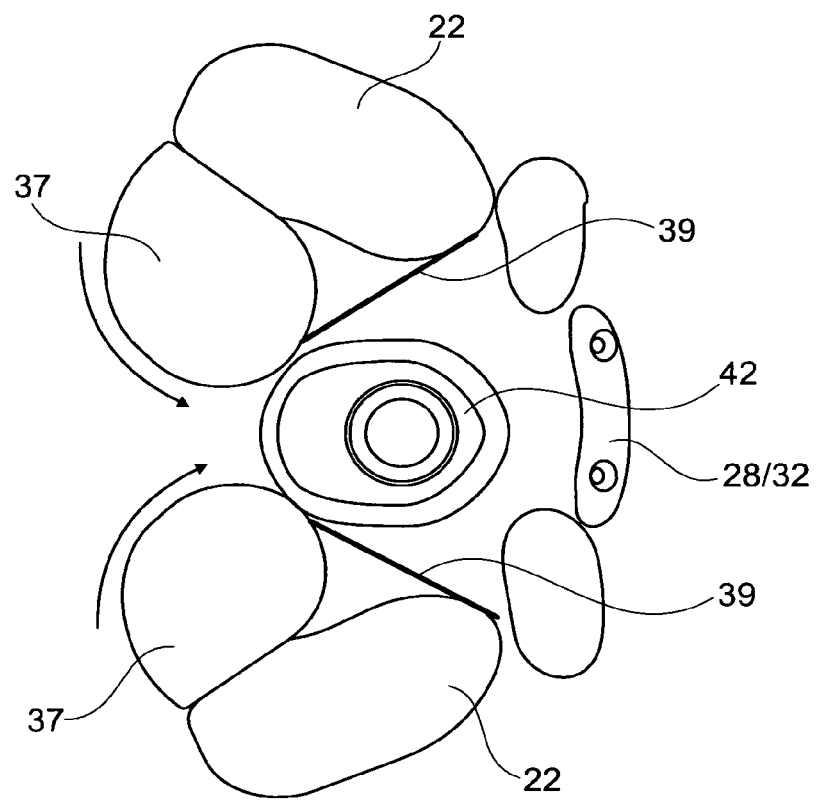
FIG. 18 is a horizontal cross-sectional view taken through the seat, occupant and airbag, in a substantially fully deployed condition.

As the airbag 1 continues to inflate, as illustrated in FIG. 16, the front cells 37 approach their substantially fully inflated condition in which they become positioned at the front of the respective inflatable chambers 8, 9 and spaced forwardly from the backrest 28 of the seat by the rearward regions of the head cells 22. As the head cells 22 and the front cells 37 inflate towards these positions, the tethers 39 become taut and thus begin to draw the front cells 37 inwardly also somewhat downwardly, so that they move to at least partially close an upper region of the developing airbag shroud around the occupant's sitting position, and more particularly around the front of the occupant's head. This is illustrated most clearly in FIG. 18, where the arrows indicate the inward movement of the front cells 37 around the sitting position, as imparted by the tethers 39. Having regard to FIG. 17, which shows the seat, occupant 42 and airbag 1 after substantially complete inflation of the airbag 1 and at a point in time after a side or oblique impact crash, it will be appreciated that the inwardly turned position of the front cells 37 serves to prevent or at least reduce the likelihood of the occupant's head sliding forwardly across the head cells 22 such that it might actually move out of the shroud defined by the inflated airbag. This helps maximise the degree of protection afforded to the seat occupant 42, particularly in front-side oblique impacts, where the inertia of the occupant's head is particularly likely to throw it forwards relative the backrest 28 and headrest 32 of the seat.

It is to be appreciated, that although embodiments have been described above with reference to FIGS. 12 and 13 in which the tethers 39 extend between the front cells 37 of the airbag 1 and rearward positions on the airbag 1, in some other embodiments it is envisaged that tethers 39 could instead extend between the front cells 37 and the structure of the seat, such as the backrest 28. In such embodiments, it is envisaged that the rear end 41 of each tether 39 will be secured to a respective anchor point provided on the backrest frame 29.

Figure 19:
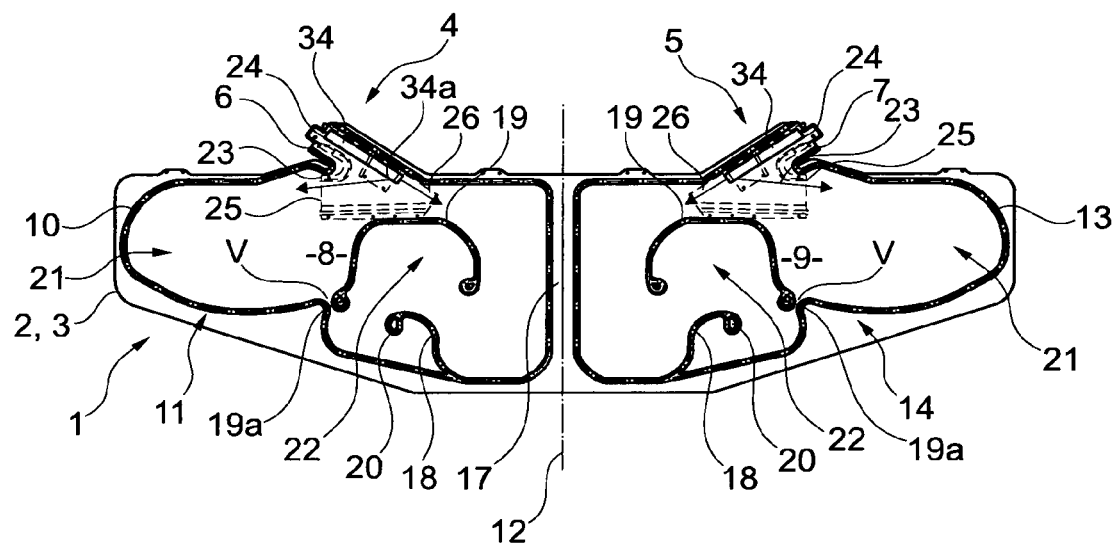
FIG. 19 is a plan view of an unpackaged airbag, similar to that illustrated in FIG. 1, but which is in accordance with another embodiment of the present invention.

Whilst the invention has been described above with reference to embodiments in which the connecting interface 17 between the inflatable chambers 8, 9 is such that the inflatable chambers 8, 9 will abut and bear against one another across the connecting interface when inflated in their respective deployed positions, this is not considered essential and other embodiments are envisaged in which this is not the case. An example of such an embodiment is illustrated in FIG. 19, which is similar in many respects to the embodiment described above with reference to FIG. 1. The same reference numbers are therefore used to denote identical or equivalent features of the airbag.

As will be noted, the airbag 1 illustrated in FIG. 19 is configured such that the two peripheral seams 10, 13 which define the respective inflatable chambers 8, 9 are completely separate from one another. Indeed, it will be noted that rather than the two seams 10, 13 being superimposed along the central axis 12 of the airbag, as is the case in the embodiment illustrated in FIG. 1, in this embodiment the seams 10, 13 comprise regions which although substantially parallel to the central axis 12, are actually spaced quite significantly from the central axis 12, on opposite sides of the central axis 12. The airbag is thus configured such that the connecting interface 17 between the two inflatable chambers is significantly wider than in the arrangement of FIG. 1. Indeed, it is envisaged that the connecting interface 17 may be even wider in some embodiments than as illustrated in FIG. 1.

In the case that the airbag 1 is formed from two interconnected sheets 2, 3 of flexible material such as fabric, then the connecting interface may be defined by a double-thickness of the material extending between the two inflatable chambers 8, 9. Alternatively, the two sheets 2, 3 may be interconnected in the region of the connecting interface 17 by additional seams or stitching, or even by other means such as adhesive or heat-fusion, Furthermore, it is envisaged that in embodiments in which the airbag is made via a so-called "one-piece weaving" technique in which the two sheets 2, 3 are woven simultaneously, then it is envisaged that the warp and weft yarns of the two layers may be interwoven in the region of the connecting interface 17, such that the connecting interface 17 takes the form of a woven web of fabric.

As will be appreciated, when the alternative airbag configuration of FIG. 19 inflates into a deployed position, the connecting interface 17 between the two inflatable chambers 8, 9 will still serve to physically interconnect the two inflatable chambers 8, 9, and to fluidly isolate them from one another, and will also extend generally centrally above the seat so as to extend generally along the sagittal place of an occupant sitting centrally within the seat. However, the resulting inflated airbag will have reduced thickness at the top of the resulting shroud, generally above the seat occupant's head. This is considered acceptable because the risk of injury to the seat occupant by impact to the top of the head is relatively low in risk. This type of arrangement may be advantageous in vehicle installations in which headroom between the top of a typically-sized seat occupant and the roof of the vehicle is particularly small, as it will permit the airbag 1 to inflate and develop into the resulting shroud configuration without becoming obstructed between the seat occupant's head and the roof of the vehicle. As will be appreciated, where headroom is particularly limited, there would be significant risk of injury to the seat occupant's neck were the airbag not to have sufficient room to deploy between the occupant's head and the roof of the vehicle during inflation.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A vehicle seat configured to support an occupant in a sitting position, the seat comprising:
   a squab;
   a backrest, and
   an airbag unit; the airbag unit including an inflatable airbag provided in an initially rolled and/or folded airbag package, the inflatable airbag including first and second inflatable chambers, the first and second inflatable chambers physically connected to one another via a connecting interface and fluidly isolated from one another, the airbag unit mounted and configured such that, upon actuation of an inflator to inflate the inflatable airbag, the first and second inflatable chambers inflate into respective deployed positions in which both of the first and second inflatable chambers: i) extend forwardly from respective opposing and laterally spaced-apart side regions of the backrest; and ii) extend upwardly, and laterally inwardly across an uppermost region of the seat towards the connecting interface, so as to thereby cooperate to define an inflated shroud around at least an uppermost region of the backrest so as to extend over the sitting position and provide lateral protection to the occupant of the seat in the sitting position,
   wherein both of the first and second inflatable chambers includes an internal gas guide positioned within a respective inlet region of the inflatable airbag, both as guides having an inlet opening configured to receive an inflator for producing inflating gas or to otherwise receive a flow of inflating gas into the gas guide, both gas guides including a first outlet opening and a second outlet opening, the first outlet opening configured to direct a first portion of the inflating gas towards a lower region of the respective inflatable chamber and the second outlet opening configured to direct a second portion of the inflating gas towards an upper region of the respective inflatable chamber, wherein the first outlet opening is larger than the second outlet opening.

2. The vehicle seat according to claim 1, wherein the first and second inflatable chambers are configured to abut and bear against one another across the connecting interface when in their respective deployed positions.

3. The vehicle seat according to claim 1, wherein the connecting interface between the first and second inflatable chambers is defined by a seam of the inflatable airbag.

4. The vehicle seat according to claim 1, wherein the first and second inflatable chambers are configured to be spaced apart from one another by the connecting interface when in their respective deployed positions.

5. The vehicle seat according to claim 1, wherein the inflatable airbag is one-piece woven, and the connecting interface is defined by a region of the inflatable airbag in which yarns of two constituent fabric layers of the inflatable airbag are interwoven.

6. The vehicle seat according to claim 1, wherein the connecting interface between the first and second inflatable chambers is substantially linear.

7. The vehicle seat according to claim 6, wherein the inflatable airbag is substantially mirror-symmetrical about the connecting interface between the inflatable chambers.

8. The vehicle seat according to claim 6, wherein the airbag is asymmetrical about the connecting interface between the first and second inflatable chambers.

9. The vehicle seat according to claim 1, wherein each of the first and second inflatable chambers comprises a plurality of fluidly interconnected inflatable cells.

10. The vehicle seat according to claim 9, wherein the inflatable cells of both of the first and second inflatable chambers are defined either by i) seams of the inflatable airbag, or ii) by regions of the airbag in which yarns of two constituent fabric layers of the inflatable airbag are interwoven.

11. The vehicle seat according to claim 10, wherein an upper region of both of the first and second inflatable chambers comprises a head cell, and a lower region of both of the first and second inflatable chambers comprises a thorax cell.

12. The vehicle seat according to claim 1, wherein both of the first and second inflatable chambers have a respective inlet region comprising an inlet port through which a respective volume of inflating gas is directed.

13. The vehicle seat according to claim 12, wherein the airbag unit comprises a single inflator which is fluidly connected to both of the inlet ports.

14. The vehicle seat according to claim 12, wherein the airbag unit comprises two discrete inflators, each inflator being fluidly connected to a respective inlet port.

15. A vehicle seat configured to su ort an occupant in a sitting position, the seat comprising:
a squab;
a backrest, and
an airbag unit, the airbag unit including an inflatable airbag provided in an initially rolled and/or folded airbag package, the inflatable airbag including first and second inflatable chambers, the first and second inflatable chambers physically connected to one another via a connecting interface and fluidly isolated from one another, the airbag unit mounted and configured such that, upon actuation of an inflator to inflate the inflatable airbag, the first and second inflatable chambers inflate into respective deployed positions in which both of the first and second inflatable chambers: i) extend forwardly from respective opposing and laterally spaced-apart side regions of the backrest: and ii) extend upwardly, and laterally inwardly across an uppermost region of the seat towards the connecting interface, so as to thereby cooperate to define an inflated shroud around at least an uppermost region of the backrest so as to extend over the sitting position and provide lateral protection to the occupant of the seat in the sitting position,
wherein both of the first and second inflatable chambers include a plurality of fluidly interconnected inflatable cells, wherein an upper region of both of the first and second inflatable chambers includes a head cell, and a lower region of both of the first and second inflatable chambers includes a thorax cell, wherein both of the first and second inflatable chambers has a respective inlet region comprising an inlet port through which a respective volume of inflating gas is directed, both of the first and second inflatable chambers comprising a respective internal gas guide positioned within the respective inlet region, the gas guide having an inlet opening configured to receive an inflator producing inflating gas or to otherwise receive a flow of inflating gas into the gas guide, both gas guides including a first outlet opening and a second outlet opening, the first outlet opening configured to direct a first portion of the inflating gas towards a lower region of the inflatable chamber, and the second outlet opening configured to direct a second portion of the inflating gas towards an upper region of the inflatable chamber, wherein the first outlet opening is larger than the second outlet opening and wherein the first outlet opening is directed towards or is positioned within the thorax cell, and the second outlet opening is directed towards or is positioned within the head cell.

16. A vehicle seat configured to support an occupant in a sitting position, the seat comprising:
a squab;
a backrest, and
an airbag unit, the airbag unit including an inflatable airbag provided in an initially rolled and/or folded airbag package, the inflatable airbag including first and second inflatable chambers, the first and second inflatable chambers physically connected to one another via a connecting interface and fluidly isolated from one another, the airbag unit mounted and configured such that, upon actuation of an inflator to inflate the inflatable airbag, the first and second inflatable chambers inflate into respective deployed positions in which_both of the first and second inflatable chambers: i) extend forwardly from respective opposing and laterally spaced-apart side regions of the backrest; and ii) extend upwardly, and laterally inwardly across an uppermost region of the seat towards the connecting interface, so as to thereby cooperate to define an inflated shroud around at least an uppermost region of the backrest so as to extend over the sitting position and provide lateral protection to the occupant of the seat in the sitting position,
wherein both of the first and second inflatable chambers includes an internal gas guide positioned within a respective inlet region of the inflatable airbag, both gas guides having an inlet opening configured to receive an inflator for producing inflating gas or to otherwise receive a flow of inflating gas into the gas guide, both gas guides having a Y-shaped configuration including a first outlet opening and a second outlet opening.

17. The vehicle seat according to claim 16, wherein the first outlet opening and the second outlet opening of both gas guides are directed in opposite directions.

18. The vehicle seat according to claim 16, wherein the first outlet opening of both gas guides is directed toward a respective end region of the inflatable airbag and the second outlet opening of both gas guides is directed toward a transverse central axis of the inflatable airbag.

19. The vehicle seat according to claim 16, wherein the first outlet opening is configured to direct a first portion of the inflating gas towards a lower region of the inflatable chamber and the second outlet opening is configured to direct a second portion of the inflating gas towards an upper region of the inflatable chamber.

20. The vehicle seat according to claim 16, wherein the first outlet opening is larger than the second outlet opening.

\* \* \* \* \*